United States Patent [19]

Åkerblom

[11] 4,147,182
[45] Apr. 3, 1979

[54] CONTROL VALVE, IN PARTICULAR TWO- OR THREE-WAY VALVE FOR HEAT EXCHANGERS AND THE LIKE

[75] Inventor: Åke Åkerblom, Farsta, Sweden

[73] Assignee: INRECO AB, Stockholm, Sweden

[21] Appl. No.: 771,375

[22] Filed: Feb. 23, 1977

Related U.S. Application Data

[63] Continuation of Ser. No. 518,794, Oct. 29, 1974, abandoned.

[30] Foreign Application Priority Data

Oct. 31, 1973 [DE] Fed. Rep. of Germany ....... 7414834

[51] Int. Cl.$^2$ ............................................ F16K 11/00
[52] U.S. Cl. ........................... 137/625.17; 137/599.1; 137/625.3; 137/625.4; 251/205
[58] Field of Search ............... 251/118, 121, 205, 212, 251/264, 266, 333; 137/625.17, 625.27, 625.28, 625.3, 625.37, 625.38, 625.49, 636.4

[56] References Cited

U.S. PATENT DOCUMENTS

| 1,064,565 | 6/1913 | Thurber | 137/636.4 |
| 1,753,524 | 4/1930 | Mawby | 251/264 |
| 1,966,809 | 7/1934 | Wickersham et al. | 251/1 A |
| 2,059,078 | 10/1936 | Allred | 137/312 |
| 2,212,343 | 8/1940 | Goehring | 137/625.3 X |
| 2,740,606 | 4/1956 | Koenig | 251/190 X |

FOREIGN PATENT DOCUMENTS

| 664505 | 8/1938 | Fed. Rep. of Germany | 251/205 |
| 232304 | 4/1925 | United Kingdom | 137/625.3 |
| 419122 | 11/1934 | United Kingdom | 137/340 |
| 876325 | 8/1961 | United Kingdom | 137/315 |

Primary Examiner—Martin P. Schwadron
Assistant Examiner—Richard Gerard
Attorney, Agent, or Firm—Fleit & Jacobson

[57] ABSTRACT

An inner valve comprises a stem having one fixed inner valve part and one or more inner valve parts which upon rotation of the stem are axially movable relative to the fixed part so as to provide a port of continuously variable area. The stem, with its inner valve parts, is also axially movable. The inner valve may be used in different types of control valves such as a two- or three-way valve for feeding hot or cold fluid to a heat exchanger.

9 Claims, 4 Drawing Figures

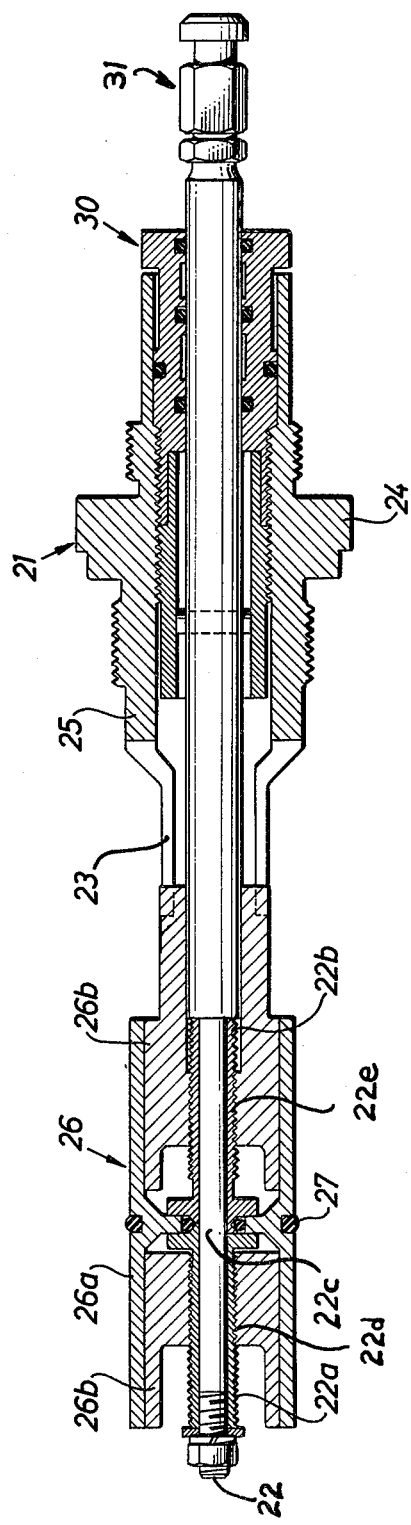

CONTROL VALVE, IN PARTICULAR TWO- OR THREE-WAY VALVE FOR HEAT EXCHANGERS AND THE LIKE

This is a continuation of application Ser. No. 518,794, filed Oct. 29, 1974, now abandoned.

The present invention relates to control valves. In particular the invention relates to a two- or three-way valve, for feeding a hot or cold fluid to heat exchangers and the like, the said control valve being of the type that comprises an inner valve located on a displaceable stem or spindle.

Such a control valve may be used for example for supplying a regulator-controlled water coil or battery for an air-treatment or air-condition plant with the necessary quantity of water. The coil is here fed from a network with water whose temperature is such that at least the energy requirement present can be met from this network. Where there are a number of similar plants, it is sought to reduce the reciprocal effect upon the various plants by designing the distribution network for a constant volume of flow. In such a case, the control valve is of a three-way design.

Commercially available valves usually have a certain pre-determined orifice area for each valve size. Certain valves have several orifice areas. When using such a valve, it is not possible to obtain ideal throttling for each individual plant. A balancing or throttle valve is therefore usually fitted in series with the three-way valve in the pipeline, through which the entire flow passes.

To overcome this problem, it has been sought to give the ratio between lifting height and actual orifice area such a valve that the water quantity circulating in the distribution system remains constant. However, because of the manufacturing tolerances of commercially available control valves and balancing valves, together with various characteristics of the water batteries, it is impossible to obtain these ideal conditions. Instead, it has been shown in practice that variations from 20 to 60% occur between minimum and maximum flow.

A further problem is related to the fact that, to prevent the coil from seizing up as a consequence of uneven water distribution and too low velocity it is usual to provide the coil with an internal circulating pump, by which means it is sought to keep the water velocity constant in the coil.

Another problem in connection with control valves of the present type is associated with the fact that pipe joints must be so designed that no exchange of water occurs between distribution system and coil system as a consequence of thermo-siphon effect in the event of zero, or little, loading of the plant.

In Swedish Pat. Nos. 215,881, 198,163 and 324,266, control valves displaying certain of these disadvantages are described.

The object of the present invention is to provide a control valve, in particular a two- or three-way valve of the type initially set out, which avoids the inconveniences of previously-known valve designs and provides a solution to the problems associated with them.

According to the present invention, the inner valve of a control valve of the type referred to comprises a part fixed relative to the stem or spindle and at least one axially movable part adapted upon rotation of the stem to provide a port having a continuously variable port area.

The invention provides the advantage, inter alia, that in a plant of the type concerned the need for separate balancing and/or separate regulating valves is obviated. Further, a more advantageous regulating procedure is obtained, since the entire pressure-drop can be assigned to the control valve.

Another advantage is that, in a simple manner, continuous variation or calibration of the port area can be provided externally when the system is under pressure, as well as the opportunity to obtain in a simple manner an indication of the area that has been set.

The axially movable part has preferably an edge portion running at an angle to the axial direction which, when the axially movable part is displaced relative to the fixed inner valve part, forms an orifice or slit whose area varies in accordance with the length of the displacement.

Continuous variation of the port area between 0 and 100% can, thus, be obtained. The movable part of the inner valve which, thus, moves in an axial direction during the regulating procedure, is thereby fully controllable along the entire travel of the inner valve.

By designing the afore-mentioned inclined edge portion in the form of an arc, the desired valve characteristics can be obtained for various circumstances.

The axially movable part is suitably provided with an internally threaded hub which engages with a corresponding thread on the stem.

In one embodiment preferred in practice and intended as a three-way valve, the inner valve comprises a fixed part with two sections and an intermediate seal, each of said sections cooperating with at least one axially movable part which parts move in a direction away from one another so as to increase the orifice area and towards one another so as to reduce the orifice area.

The movable parts are provided with internally threaded hubs, one displaying a left-hand thread and the other a right-hand thread.

It is, thus, possible within the scope of the present invention to provide a variation of the starting point of the movement of both axially movable parts relative to one another.

It is also possible to employ a second or separate regulator to control the total port areas of the control valve slide by rotating the spindle or stem.

Further features and advantages of a control valve according to the present invention will be apparent from the following description of an embodiment thereof wherein reference is made to the accompanying drawings.

FIG. 4 is a sectional view of the inner valve along the axial plane indicated at 4—4 in FIG. 3.

Corresponding elements have been given the same reference numerals in the different figures.

Figure 1:
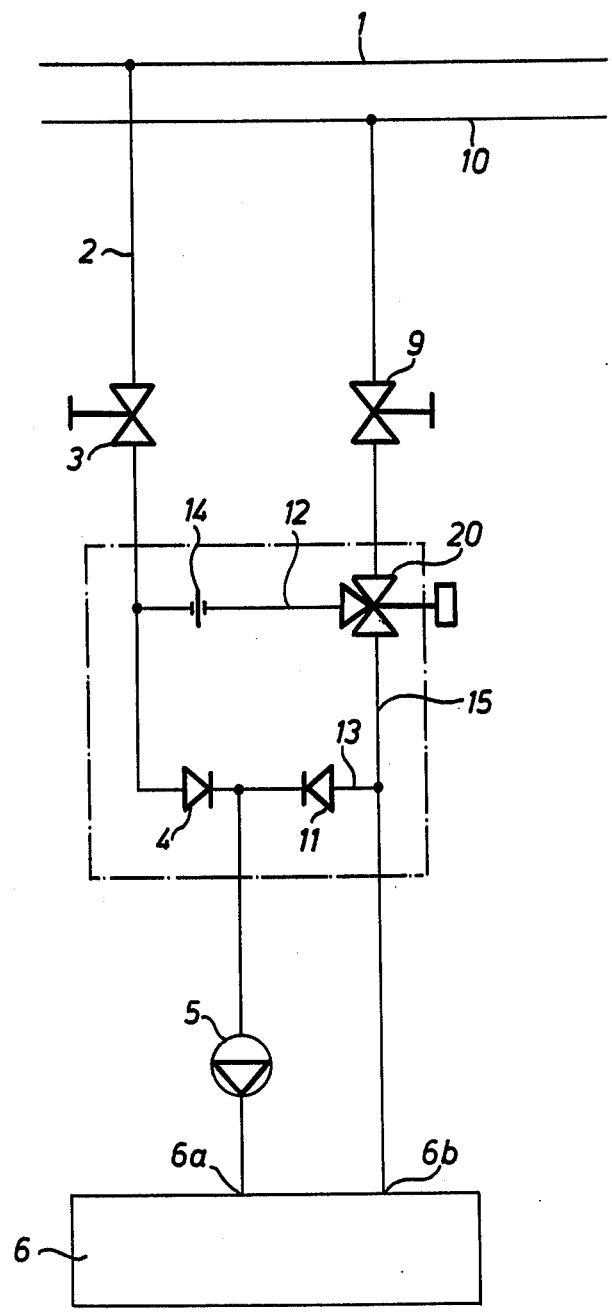
FIG. 1 is a general diagram of a supply system for a hot water coil or battery, for example for an air condition plant, provided with a control valve according to the invention.
Figure 2:
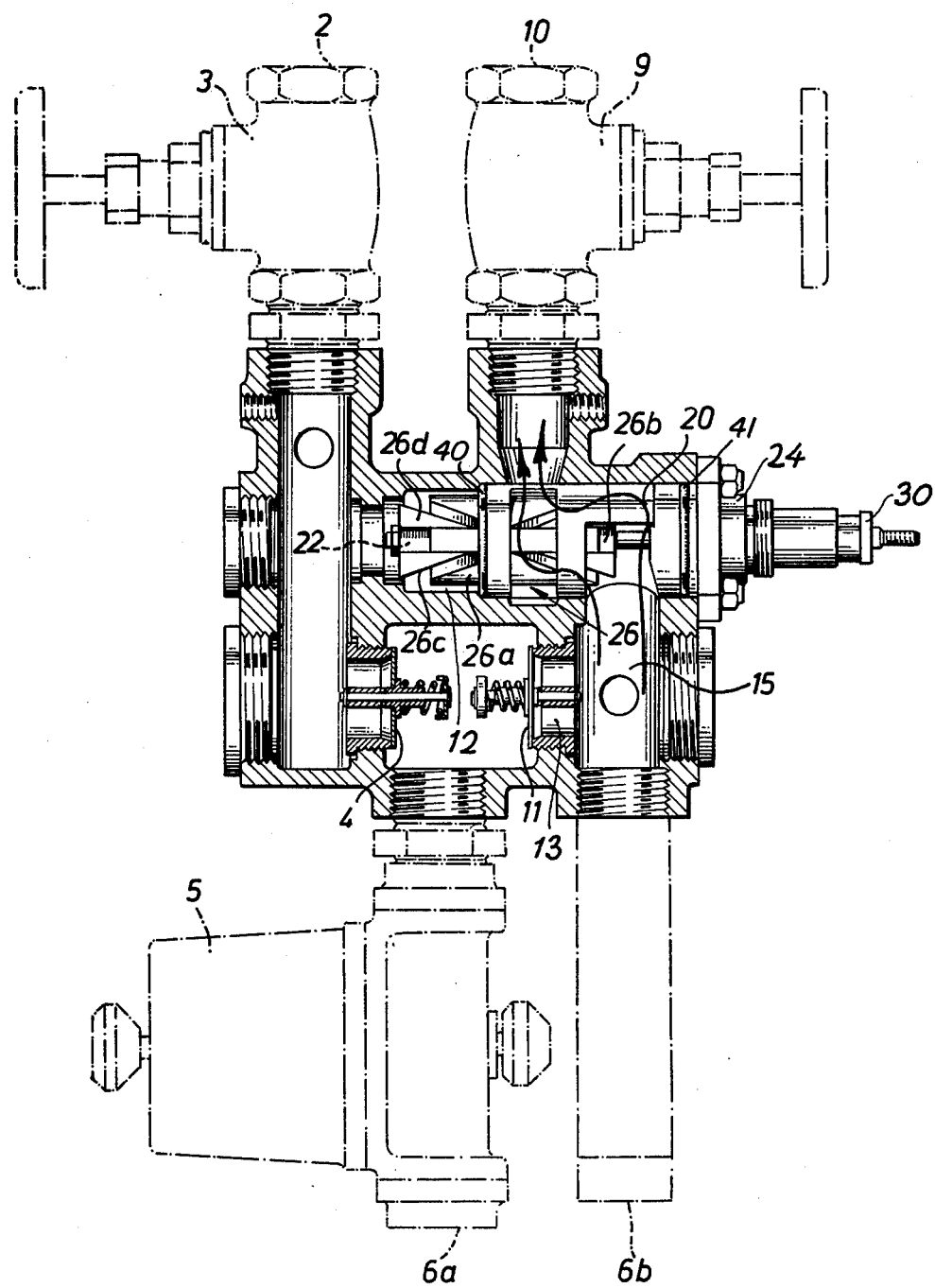
FIG. 2 is a section through a control valve, together with associated parts, for a supply system according to FIG. 1, the central part of the plant surrounded by a dotted line in FIG. 1 being specially indicated.

In FIG. 1, 1 indicates the inlet pipe of a distribution network from which water is supplied via an inlet pipe 2, a stop valve 3 and a check valve or non-return valve 4. Behind the check valve there is a pump 5 which pumps the water via an inlet 6a to a coil or battery 6. After having passed the coil, the water flows out via an outlet 6b, passes a control valve 20, a stop valve 9, and then back to the return pipe 10 of the distribution system. This action can be seen by the arrows in FIG. 2, wherein within control valve 20, water flows axially through the interior right-hand section of an inner valve 26 between a stem 22 and respective fixed and movable parts 26a and 26b. Upon reaching the vicinity of outlet line 10, the water flows outwardly through the slit-shaped ports formed by fixed part 26a and movable parts 26b, and into outlet line 10. The control valve 20 is shown in FIG. 2 in such a position that the coil 6 receives maximum energy. It is also assumed that the pump 5 is provided with a throttle device which is so adjusted that the flow through a check valve 11 under such load conditions is practically zero. This device can be externally of the pump.

If the load on the coil 6 is reduced and the inner valve set in a central position, wherein O-ring 27 resides in the central region of outlet channel 10, circulation is effected in a similar manner, with the difference that the quantity of water not required for the coil passes via a by-pass 12 through the control valve 20 and the stop valve 9 into the return pipe 10. A corresponding amount will then pass from the coil outlet 6b via a branch pipe 13, the check valve 11 and the pump 5 back to the coil via the inlet 6a.

When the energy requirement on the coil 6 ceases, the control valve 20 is adjusted to the fully closed position, wherein O-ring 27 resides to the right (FIG. 2) of outlet channel 10. In this position, all the water passes from the inlet of the distribution network via the stop valve 3, the by-pass 12, the control valve 20 and the stop valve 9 back to the return pipe 10. There is then also full circulation from the coil outlet 6b via the check valve 11, the pump 5 and the inlet 6a. There is, however, no circulation in the pipe 15 between the check valve 11 and the inlet of control valve 20. FIG. 2 illustrates the design of the control valve 20, the two stop valves 3 and 9, the two check valves 4 and 11, the pump 5 with the inlet 6a and the outlet 6b from the coil. The control valve 20 includes an inner valve 26 positioned in a sleeve element sealed to the valve housing. Two O-rings, 40 and 41, are associated with the sleeve element.

Figure 3:
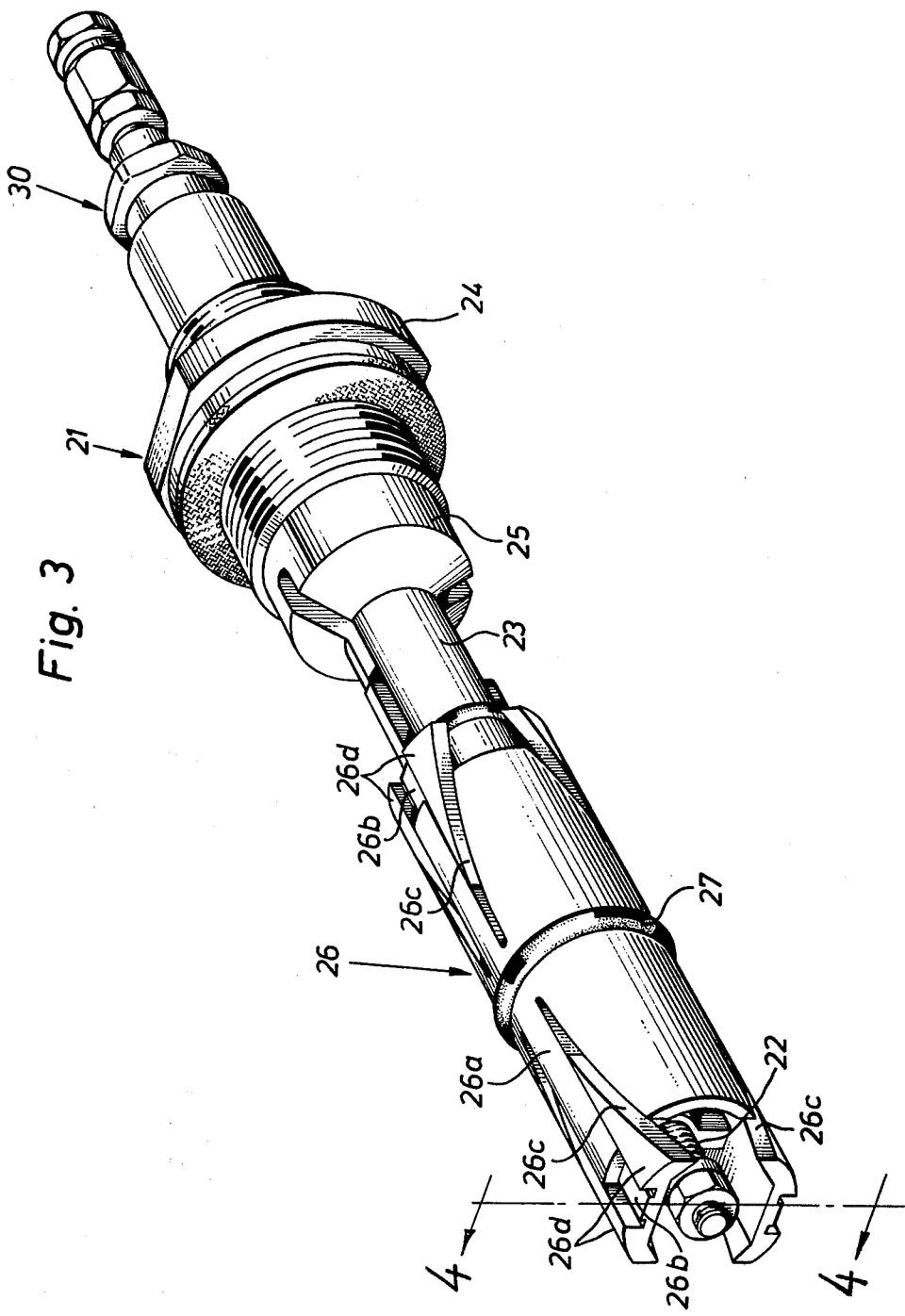
FIG. 3 is a perspective view of the inner valve for a control valve according to the invention.

The inner valve of the control valve will be described in detail below in connection with FIGS. 3 and 4. The inner valve which is indicated in general by reference numeral 21 comprises a stem or spindle 22 including bosses 22a and 22b with a surrounding casing or sleeve 23 and a lock nut 24 with a sleeve part 25. It is therefore possible both to axially displace and to rotate the stem 22 within sleeve 23, by manipulating the stem at 31. At one end the stem supports an inner valve 26 comprising two sections with an intermediate sealing ring 27 in the form of an O-ring.

Each inner valve includes a part 26a fixed relative to the stem and a number of relatively movable parts 26b (four in the described embodiment) which are adapted to perform an axial movement relative to the fixed part 26a when the stem is rotated, thus creating a continuously variable orifice slit or port opening. To achieve the object, the movable parts have one axially extending edge surface 26d and one edge surface 26c, possibly arc-shaped, running at an angle to the axial direction. As is apparent from FIG. 3, the relatively movable parts 26b are arranged in pairs, two pairs being supported by the hub or boss, 22a or 22b, located in each slide part, one end of this hub or boss being designed as half of a claw coupling 22c. One of the hubs or bosses has an external left-hand thread and the other an external right-hand thread, shown, for example, at 22d and 22e, respectively. Corresponding threads are provided in the relatively movable parts, i.e., one has an internal left-hand thread and the other an internal right-hand thread. When the stem or spindle 22 is rotated, the relatively movable parts 26b will approach or withdraw from the fixed part 26a. The inclined and possibly arc-shaped edges 26c will then also approach or withdraw from one another. The distance between the relatively movable parts becomes proportional to the actual opening area. By external rotation of the stem, as at 31, a variation of the port areas of the inner valve from practically 0 to 100% is provided. The inner valve which moves axially during the regulating procedure is therefore fully controllable, or adjustable over its whole travel.

The stem may also be provided with a means (not shown) having the purpose that the position of the gland screw 30 relative to the packing box gives an indication of the adjustment position of the relatively movable parts.

The two opposing relatively movable parts 26b can display various orifice or throttling areas, which can be brought about by variation of the starting point of the movement of the said parts relative to the fixed inner valve part.

The stem movement is controlled by a regulator having a setting motor which displaces the inner valve in an axial direction dependent upon the load of the heating coil. If desired, the port area of the inner valve can be controlled by a second regulator by means of which the stem is rotated.

When using a control valve arrangement in a district heating plant, it is important for the return temperature to be kept as low as possible. In such a case, the requirement of constant flow-through volume in the distribution network can be set aside. The control valve 20 should then serve as a two-way valve. This can be effected by placing a means 14, for example a washer, in the pipe 12 to prevent flow through this pipe. In such a case, it is sufficient to have only one half-part of the inner valve.

The check valve 11 serves to stop the flow if the pump 5 should cease operating for one reason or another.

In the event of an upside down installation of the device shown in FIG. 1, it is realized that with the control valve 20 closed the hot water — where the check valve 4 is lacking — would rise upwards in the branch pipe 12 at the same time as the cold water would sink to the point where the check valve 4 is positioned. Undesired heat exchange because of thermo-siphon effect would then occur. By placing the check valve 4 in the position indicated, this form of double-circulation is prevented whatever the valve setting position and irrespective of whether the coil 6 is supplied with hot or cold water.

In an alternative embodiment (not shown) the stem may be non-rotatable whereas an inner valve part is rotatable relative to the stem, for instance via the valve seat so as to vary the port area.

What I claim is:

1. A control valve, in particular a two- or three-way valve for feeding hot or cold water from an inlet to a heat exchanger, said control valve comprising: a housing in association with said inlet and said heat exchanger; an elongated stem (22), at least a portion of which resides in said housing, said stem being mounted for rotation and for axial displacement relative to said housing; a non-rotatable valve part (26a) fixed axially relative to said stem for axial displacement therewith and for axially moving from one to another discrete mode of valving operation; at least one movable valve part (26b) axially movable with said stem, and also axially movable relative to said stem and relative to said non-rotatable valve part; means for positively displacing said stem, said non-rotatable valve part (26a) and said movable valve part (26b) between a first axial position in which the non-rotatable valve part (26a) coacts with a valve seat on the inner surface of the housing for shutting off flow of water through the valve and a second position axially spaced from the first position in which flow of water through the valve is permitted; control means associated with said stem and with said movable valve part, for axially moving said movable valve part relative to said non-rotatable valve part upon rotation of said stem; and port means having a continuously variable port area which is determined by the relative position between said non-rotatable valve part and said movable valve part; said port area serving to control the flow of water between said inlet and said heat exchanger when said non-rotatable valve part is in said second position.

2. A control valve according to claim 1, wherein the axially movable part (26b) has an edge portion (26c) running at an angle to the axial direction which, when the axially movable part is displaced relative to the fixed inner valve part, forms an orifice or slit whose area varies in accordance with the length of the displacement.

3. A control valve according to claim 2, wherein the said edge portion is arc-shaped.

4. A control valve according to claim 1, wherein the stem has a threaded boss (22d, 22e) which engages with a corresponding thread on the axially movable part.

5. A control valve according to claim 1 for use as a three-way valve, wherein said stem includes two fixed sections axially fixed relative to the stem and an intermediate seal (27) mounted on said stem, each of the fixed sections cooperating with an axially movable part (26b) mounted on said stem for movement toward and away from said fixed sections, these movable parts moving in a direction away from one another when the port area is increased and towards one another when it is reduced.

6. A control valve according to claim 5, each movable part engaging with a threaded boss, wherein one boss displays a left-hand thread and the other a right-hand thread.

7. A control valve according to claim 1, wherein the control means includes means for relative rotation between the stem and the axially movable part so as to control the axial position of the axially movable part and thereby the port area.

8. For use in a control valve, in particular a two- or three-way valve for feeding hot or cold water from an inlet to a heat exchanger: an elongated stem (22) adapted to be mounted for rotation and for axial displacement in such a manner that the rotation and axial displacement movements are independent from each other in every position of the stem; a non-rotatable valve part (26a) fixed axially relative to said stem for axial displacement therewith and for axially moving from one to another discrete mode of valving operation; at least one movable part (26b) axially movable with said stem, and also axially movable relative to said stem and relative to said non-rotatable valve part; said non-rotatable valve part, in a first of said discrete modes, being adapted separately from the movable valve part to directly cooperate with a portion of the control valve to block water flow through the control valve and, in a second of said discrete modes, said non-rotatable valve part being adapted to cooperate with said movable valve part to control water flow through the control valve; control means associated with said stem and with said movable valve part, for axially moving said movable valve part relative to said non-rotatable valve part upon rotation of said stem; and port means having a continuously variable port area which is determined by the relative position between said non-rotatable valve part and said movable valve part; said port area adapted to control the flow of water between the inlet and the heat exchanger when said non-rotatable valve part is in said second of said discrete modes.

9. The invention of claim 8 wherein said port area is variable in all positions of the non-rotatable valve part.

* * * * *